United States Patent
Markwart et al.

(10) Patent No.: US 9,394,055 B2
(45) Date of Patent: Jul. 19, 2016

(54) MIXER ASSEMBLY FOR AN AIRCRAFT AIR CONDITIONING SYSTEM

(71) Applicant: AIRBUS OPERATIONS GMBH, Hamburg (DE)

(72) Inventors: Michael Markwart, Halstenbek (DE); Jens Lohmar, Hamburg (DE); Dariusz Krakowski, Buxtehude (DE); Martin Schmid, Hamburg (DE); Torsten Stengel, Buxtehude (DE); Jens Elmers, Hamburg (DE); Thomas Scherer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 935 days.

(21) Appl. No.: 13/646,231

(22) Filed: Oct. 5, 2012

(65) Prior Publication Data

US 2013/0035027 A1 Feb. 7, 2013

Related U.S. Application Data

(63) Continuation of application No. PCT/EP2011/001768, filed on Apr. 8, 2011.

(60) Provisional application No. 61/322,564, filed on Apr. 9, 2010, provisional application No. 61/322,571, filed on Apr. 9, 2010.

(30) Foreign Application Priority Data

Apr. 9, 2010 (DE) .......................... 10 2010 014 354
Apr. 9, 2010 (DE) .......................... 10 2010 014 355

(51) Int. Cl.
*B64D 13/02* (2006.01)
*B64D 13/00* (2006.01)
*B64D 13/06* (2006.01)

(52) U.S. Cl.
CPC ........ *B64D 13/00* (2013.01); *B64D 2013/0688* (2013.01)

(58) Field of Classification Search
CPC .................... B64D 2013/0688; B64D 13/06
USPC ...................................................... 454/71, 76
See application file for complete search history.

(56) References Cited

U.S. PATENT DOCUMENTS 4,073,832 A * 2/1978 McGann ....................... 261/118
4,209,993 A * 7/1980 Rannenberg ..................... 62/80

(Continued)

FOREIGN PATENT DOCUMENTS

| CN | 101421024 | 4/2009 |
|---|---|---|
| DE | 44 25 871 | 2/1996 |

(Continued)

OTHER PUBLICATIONS

International Search Report dated Sep. 29, 2011.

(Continued)

*Primary Examiner* — Steven B McAllister
*Assistant Examiner* — Jonathan Cotov
(74) *Attorney, Agent, or Firm* — Dickinson Wright PLLC (57) ABSTRACT

A mixer for an aircraft air conditioning system has first and second fresh air lines and first and second recirculation air lines. A first premixer is connected to the first fresh air line and the first recirculation air line, to mix the fresh air with the recirculation air thereof. A second premixer is connected to the second fresh air line and the second recirculation air line, to mix the fresh air with the recirculation air thereof. A main mixer is connected by a first premixed air line to the first premixer and by a second premixed air line to the second premixer. The main mixer is adapted to be supplied through the first premixed air line and the second premixed air line exclusively with premixed air from the first and/or the second premixer.

13 Claims, 7 Drawing Sheets

(56) References Cited

U.S. PATENT DOCUMENTS

| | | | | |
|---|---|---|---|---|
| 5,461,882 | A * | 10/1995 | Zywiak | 62/401 |
| 5,545,084 | A * | 8/1996 | Fischer et al. | 454/76 |
| 5,704,218 | A * | 1/1998 | Christians et al. | 62/172 |
| 5,890,957 | A * | 4/1999 | Scherer et al. | 454/76 |
| 6,389,826 | B2 * | 5/2002 | Buchholz et al. | 62/172 |
| 6,401,473 | B1 * | 6/2002 | Ng et al. | 62/239 |
| 6,415,621 | B2 * | 7/2002 | Buchholz et al. | 62/402 |
| 6,449,963 | B1 * | 9/2002 | Ng et al. | 62/86 |
| 6,681,591 | B2 * | 1/2004 | Defrancesco et al. | 62/401 |
| 7,185,736 | B2 * | 3/2007 | McCarty | 181/224 |
| 7,727,057 | B2 * | 6/2010 | Beier et al. | 454/76 |
| 7,878,887 | B2 * | 2/2011 | Elmers et al. | 454/71 |
| 8,074,927 | B2 * | 12/2011 | Markwart | B64D 13/00 244/118.5 |
| 8,292,222 | B2 * | 10/2012 | Solntsev et al. | 244/118.5 |
| 8,303,384 | B2 | 11/2012 | Krakowski | |
| 8,336,821 | B2 * | 12/2012 | Shell et al. | 244/118.5 |
| 8,435,103 | B2 * | 5/2013 | Centofante | 454/71 |
| 2002/0056286 | A1 * | 5/2002 | Ng et al. | 62/402 |
| 2002/0162345 | A1 * | 11/2002 | Laugt | 62/239 |
| 2003/0005718 | A1 * | 1/2003 | Mitani et al. | 62/402 |
| 2005/0051668 | A1 * | 3/2005 | Atkey | B64D 13/06 244/118.5 |
| 2007/0158499 | A1 * | 7/2007 | Whittingham | A61L 9/20 244/118.5 |
| 2008/0210816 | A1 * | 9/2008 | Feisthammel et al. | 244/118.5 |
| 2009/0071556 | A1 * | 3/2009 | Bourlart et al. | 137/597 |
| 2009/0073799 | A1 * | 3/2009 | Bourlart et al. | 366/107 |
| 2009/0165878 | A1 * | 7/2009 | Krakowski et al. | 137/896 |
| 2010/0273410 | A1 * | 10/2010 | Gumm et al. | 454/76 |
| 2010/0279595 | A1 * | 11/2010 | Horstman et al. | 454/76 |
| 2011/0237173 | A1 * | 9/2011 | Kelnhofer et al. | 454/76 |

FOREIGN PATENT DOCUMENTS

| | | |
|---|---|---|
| WO | 97/37890 | 10/1997 |
| WO | 2004/106158 | 12/2004 |
| WO | 2007/115810 | 10/2007 |
| WO | 2010/049060 | 5/2010 |

OTHER PUBLICATIONS

Chinese Office Action dated May 16, 2014, with English Summary.

* cited by examiner

MIXER ASSEMBLY FOR AN AIRCRAFT AIR CONDITIONING SYSTEM

The present invention relates to a mixer assembly for an aircraft air conditioning system, a method of operating such a mixer assembly, and an aircraft air conditioning system equipped with such a mixer assembly.

In a modern passenger aircraft the passenger cabin or sub-regions of the passenger cabin, the cargo hold or sub-regions of the cargo hold, the cockpit and the crew rest areas form various air conditioning zones that are conventionally air-conditioned by means of an aircraft air conditioning system both during cruising and during taxiing of the aircraft. Hot bleed air under an elevated pressure is removed from the engine compressors or auxiliary engine compressors and supplied to the aircraft air conditioning system. In the air conditioning units, the so-called air conditioning packs of the aircraft air conditioning system, the bleed air is expanded and cooled down to a desired low temperature. Finally, the air conditioned in the air conditioning units is conveyed as cooled fresh air into a main fresh-air line of the air conditioning system. The fresh air flowing through the main fresh-air line is conveyed into a mixer, where it is mixed with recirculation air that is extracted from the passenger cabin. The mixed air that is produced in the mixer from cold fresh air provided by the air conditioning packs and recirculation air extracted from the passenger cabin is finally used to air-condition the various air conditioning zones of the aircraft.

From DE 44 25 871 C1 an air conditioning system for air-conditioning an aircraft having two decks disposed one above the other is known, in which recirculation air discharged from an upper deck is first supplied to a premixer, where it is mixed with cold fresh air. The premixed air from the premixer is conveyed into a main mixer, where it is mixed with recirculation air discharged directly from the lower deck as well as with further cold fresh air from the air conditioning packs.

Main mixers currently used in aircraft air conditioning systems are connected by appropriate connections to a plurality of pipe systems, through which, depending on the operating state of the aircraft, air flows at different flow rates and at different temperatures. However, the arrangement, the geometry and the course of the connections and pipe systems may be optimized usually only for one operating state, i.e. one flow rate and one temperature. Installation space restrictions on board the aircraft moreover influence the geometry and the course of the connections and pipe systems. In dependence upon the flow rate and the temperature of the air supplied to the mixer assembly through the pipe systems, therefore, temperature differences within the mixer and hence variations of the mixing quality may arise, wherein in particular a fault scenario linked to failure of an air flow may considerably impair the mixing quality.

A consequence of insufficient mixing of the cold and warm air flows in the mixer is that it becomes difficult or even impossible to supply all of the air outlets of the mixer with air of the desired identical temperature and with the desired identical fresh-air/recirculation-air ratio. This may result in comfort losses, but also in a non-uniform supply of fresh air to the passengers situated on board the aircraft. Furthermore, in operating situations of the air conditioning system, in which the cold fresh air is supplied at a temperature <0° C. to the mixer, because of the moisture contained in the fresh air an inadequate mixing of the cold fresh air supplied to the mixer with warm recirculation air may lead to the attachment of ice and snow in the mixer or in the pipe systems connected to the mixer.

The invention is directed to the object of indicating a mixer assembly for an aircraft air conditioning system that enables a uniform mixing of the warm and cold air flows that are supplied to the mixer assembly. The invention is further geared to the object of providing a method of operating such a mixer assembly as well as an aircraft air conditioning system equipped with such a mixer assembly.

This object is achieved by a mixer assembly for an aircraft air conditioning system having features of attached claims, by a method of operating a mixer assembly for an aircraft air conditioning system having features as in attached claims, and by an aircraft air conditioning system having features as in attached claims.

A mixer assembly according to the invention that is suitable for use in an aircraft air conditioning system comprises a plurality of fresh air lines, which are adapted to be flowed through with cold fresh air during operation of the mixer assembly. The fresh air flowing through the fresh air lines may be produced by one or more air conditioning units of the aircraft air conditioning system. The mixer assembly according to the invention further comprises, a plurality of recirculation air lines, which are adapted to be flowed through with recirculation air discharged from an aircraft cabin during operation of the mixer assembly. The recirculation air flowing through the recirculation air lines may be conveyed out of the aircraft cabin by means of appropriate conveying devices disposed in the recirculation air lines.

A first premixer of the mixer assembly is connected to at least one fresh air line and at least one recirculation air line and is adapted to mix the fresh air that is conveyed through the fresh air lines into the first premixer with the recirculation air that is conveyed through the recirculation air line into the first premixer. In a similar manner a second premixer, which is connected to at least one fresh air line and at least one recirculation air line, is adapted to mix the fresh air that is conveyed through the fresh air line into the second premixer with the recirculation air that is conveyed through the recirculation air line into the second premixer.

Finally, a main mixer is provided, which is connected by a first premixed air line to the first premixer and by a second premixed air line to the second premixer. The main mixer is adapted to be supplied through the first premixed air line and the second premixed air line exclusively with premixed air from the first and/or the second premixer. In other words, neither non-premixed cold fresh air, nor non-premixed warm recirculation air but exclusively premixed air from the first and/or the second premixer is supplied to the main mixer of the mixer assembly according to the invention. The mixer assembly according to the invention is consequently as a whole of a two-stage construction, i.e. all of the air flows supplied to the mixer assembly are first treated in one of the premixers before being supplied to the main mixer.

The premixed air flows supplied to the main mixer may be controlled, in terms of their temperature and flow rate, independently of one another. In this way the consumption of hot engine bleed air, which is needed to produce cold fresh air in the air conditioning units, may be optimized. Furthermore, the supply of consistently premixed air flows minimizes temperature differences that arise in the main mixer, with the result that the mixing quality in the main mixer is very insensitive to variations of the flow rates and the temperatures of the premixed air flows that are supplied to the main mixer. The mixer assembly according to the invention is therefore notable for the fact that independently of the operating situation of the aircraft air conditioning system, i.e. independently of variations of the flow rates and/or temperatures of the air flows that are supplied to the mixer assembly, a constant mixing quantity may be achieved. This applies even in a fault scenario linked to failure of an air flow, i.e. with the mixer assembly according to the invention even in the case of such a fault scenario it is still possible to realize a satisfactory mixing quality. A further advantage of the mixer assembly according to the invention is that, by virtue of the uniform mixing of the cold fresh air supplied to the mixer assembly with warm recirculation air, an attachment of ice and snow in the mixer assembly or in pipe systems connected to the mixer assembly that is caused by inadequate mixing of the air flows supplied to the mixer assembly may be reliably prevented. Finally, the main mixer of the mixer assembly according to the invention is connected only to the premixed air lines and may therefore have fewer air connections and be of a simpler design that takes up less installation space.

Preferably a filter device for filtering the recirculation air flowing through the recirculation air line is disposed in at least one of the recirculation air lines. Preferably each recirculation air line is provided with a filter device for filtering the recirculation air flowing through the recirculation air line. The filter device(s) is/are preferably disposed in the region of an inlet of the recirculation air line(s) and may therefore ensure that the recirculation air discharged from the aircraft cabin is filtered before it flows through the recirculation air line(s).

If in mixer assemblies of prior art a conveying device for conveying recirculation air out of the aircraft cabin fails, the conveying device(s) that is/are still functional has/have to take over the conveying of the recirculation volumetric flow that is conveyed out of the aircraft cabin by the failed conveying device during normal operation of the mixer assembly. This means that, in the event of failure of a first conveying device disposed for example in a first recirculation air line, a second conveying device disposed for example in a second recirculation air line additionally conveys the recirculation air volumetric flow, which is conveyed by the first conveying device through the first recirculation air line during normal operation of the mixer assembly, through the second recirculation air line and hence through the second filter device disposed in the second recirculation air line. The result is consequently a markedly higher pressure loss through the second filter device than during normal operation of the mixer assembly, this having a negative influence on the operating performance of the second conveying device.

The mixer assembly according to the invention therefore preferably comprises a first connection line, which branches off from a first recirculation air line downstream of a first filter device disposed in the first recirculation air line and opens out into a second recirculation air line downstream of a second filter device disposed in the second recirculation air line. For example, the first connection line may branch off from the first recirculation air line upstream of a first conveying device disposed in the first recirculation air line and open out into the second recirculation air line upstream of a second conveying device disposed in the second recirculation air line.

Given such a development of the mixer assembly, in the event of failure of the first conveying device recirculation air may be conveyed by the still intact second conveying device through the first filter device disposed in the first recirculation air line, through the first recirculation air line and finally through the first connection line into the second recirculation air line. In a similar manner, in the event of failure of the second conveying device recirculation air may be conveyed by the still intact first conveying device through the second filter device disposed in the second recirculation air line, through the second recirculation line and finally through the first connection line into the first recirculation air line. Thus, even in the event of failure of a conveying device the recirculation air may be conveyed uniformly through the first and the second filter device into the first and the second recirculation air line and hence the pressure loss through the filter devices may be minimized in an advantageous manner.

The mixer assembly according to the invention may further comprise a second connection line, which branches off from the first recirculation air line downstream of the first conveying device disposed in the first recirculation air line and opens out into the second recirculation air line downstream of the second conveying device disposed in the second recirculation air line. Given such a configuration of the mixer assembly, in the event of failure of the first conveying device recirculation air, which is conveyed by the still intact second conveying device through the first filter device, the first recirculation air line and the first connection line into the second recirculation air line, may be conveyed through the second connection line downstream of the failed first conveying device back into the first recirculation air line and be supplied from there to the first premixer. In a similar manner, in the event of failure of the second conveying device recirculation air, which is conveyed by the still intact first conveying device through the second filter device, the second recirculation air line and the first connection line into the first recirculation air line, may be conveyed through the second connection line downstream of the failed second conveying device into the second recirculation air line and be supplied from there into the second premixer.

In an alternative embodiment of the mixer assembly according to the invention, a first recirculation air line and a second recirculation air line open out preferably into a junction line, which is connected to the first premixer via a first branch line and to the second premixer via a second branch line. The junction line preferably comprises over part of its length two junction line portions that are adapted to carry mutually parallel flows, wherein a first conveying device may be disposed in a first junction line portion and a second conveying device may be disposed in a second junction line portion.

Given such a configuration of the mixer assembly, in the event of failure of the first conveying device the still intact second conveying device may convey recirculation air through the first filter device and the first recirculation air line into the junction line. The recirculation air flowing through the junction line may then be distributed by means of the first and the second branch line between the first and the second premixer. In a similar manner, in the event of failure of the second conveying device the still intact first conveying device may convey recirculation air through the second filter device and the second recirculation air line into the junction line and then supply the recirculation air flowing through the junction line via the first and the second branch line to the first and the second premixer.

By virtue of the constant flow through both filter devices it is ensured that the first and the second filter device, even in the event of failure of the first and/or the second conveying device, are uniformly loaded and hence also uniformly clogged. This enables, in the event of failure of the first or the second conveying device, a further evening-out of the recirculation volumetric flow conveyed out of the aircraft cabin by means of the still intact conveying device. Furthermore, the first and the second conveying device may be operated at the same operating point.

The first premixer may be configured in the form of a tubular mixer. Alternatively or in addition thereto, the second premixer may be configured in the form of a tubular mixer. A fresh-air line connection and a recirculation-air line connection of the first premixer may be disposed in such a way that the warm recirculation air is supplied at an angle of ca. 45° to 90° to the cold fresh air flow flowing through the first premixer. Alternatively or in addition thereto, a fresh-air line connection and a recirculation-air line connection of the second premixer may be disposed in such a way that the warm recirculation air is supplied at an angle of ca. 45° to 90° to the cold fresh air flow flowing through the second premixer.

The fresh-air line connection of the first and/or the second premixer may have a smaller flow cross section than a premixing portion of the first and/or the second premixer disposed downstream of the fresh-air line connection. In other words, the fresh-air line connection of the first and/or the second premixer may be designed in the form of a nozzle, which supplies the cold fresh air at a high flow velocity to the premixing portion of the first and/or the second premixer. The cold fresh air flow then acts as an injector, with the result that the pressure loss arising in the premixing portion may be minimized. This makes it possible to relieve the conveying device(s) used to convey the recirculation air flows into the premixers. The nozzle effect of the fresh-air line connection may be further improved if the fresh-air line connection is of a two-part construction and the two partial connections forming the fresh-air line connection have an even smaller flow cross section.

In order to control the recirculation air flow flowing through the recirculation-air line connection of the first and/or the second premixer, a flow control device may be disposed in the recirculation-air line connection of the first and/or the second premixer. The flow control device may comprise at least one flow control wedge, the cross section of which widens in the direction of flow of the recirculation air through the recirculation-air line connection. The arrangement of a flow control wedge in the recirculation-air line connection leads to the formation of a warm bypass flow that positions itself around the cold fresh air flow supplied through the fresh-air line connection into the premixer and hence prevents icing of the premixer. The arrangement of two or more flow control wedges in the recirculation-air line connection enables the production of a layering of alternate cold and warm air flows oriented at an angle of ca. 45° to 90° relative to one another, which further improve the mixing effect of the premixer.

Alternatively or in addition thereto, a flow control device may be disposed in the fresh-air line connection of the first and/or the second premixer. The flow control device may likewise comprise at least one flow control wedge, the cross section of which widens in the direction of flow of the fresh air through the fresh-air line connection. The arrangement of a flow control wedge or a plurality of flow control wedges in the fresh-air line connection enables an enlargement of the mixing layer and hence improves the mixing effect of the premixer.

The main mixer of the mixer assembly according to the invention may comprise a first premixed air connection and a second premixed air connection, which are disposed in such a way that the premixed air flows from the first and the second premixer are supplied to the main mixer from substantially opposite directions and collide with one another in a mixing portion of the main mixer. The first premixed air connection and the second premixed air connection of the main mixer may have identical or different flow cross sections. However, even if the flow cross sections of the first premixed air connection and the second premixed air connection are different, the "symmetrical" construction of the main mixer enables a simplified logic control of the components of the main mixer.

The first and/or the second premixed air connection of the main mixer may have a course that substantially follows an elliptical path. As a result of such a flow route, the premixed air flows are supplied to the main mixer slightly upwards at a positive angle. This helps to achieve an effect whereby ice and/or snow does not collect in the region of a base of the main mixer but is entrained, and in the process melted, by the air flow.

In the first premixed air connection of the main mixer a flow control device may be disposed. In addition or alternatively thereto, a flow control device may be disposed in the second premixed air connection of the main mixer. The flow control device may comprise at least one flow control wedge, the cross section of which widens in the direction of flow of the premixed air through the first and/or the second premixed air connection. By virtue of the arrangement of a flow control device in the first and/or the second premixed air connection of the main mixer the mixing effect of the main mixer may be further improved.

The fresh air lines of the mixer assembly according to the invention are preferably designed substantially without deflections. Equally, the first and/or the second premixed air line are/is preferably designed substantially without deflections. Such a line design minimizes the danger of icing. It moreover allows cold air, which is needed for example for a fresh air supply of the cockpit that is independent of the operation of the premixers and/or of the main mixer, to be diverted from the first and/or the second fresh air line and/or from the first and/or the second premixed air line, without there being an increased risk of Icing at a corresponding line connection point.

In a method according to the invention of operating a mixer assembly for an aircraft air conditioning system, cold fresh air produced for example by an air conditioning unit or by a plurality of air conditioning units is conveyed through a plurality of fresh air lines. Furthermore, recirculation air discharged for example by means of a conveying device or a plurality of conveying devices from an aircraft cabin is conveyed through a plurality of recirculation air lines. The fresh air from at least one fresh air line is premixed with the recirculation air from at least one recirculation air line in a first premixer. The fresh air from at least one fresh air line is moreover premixed with the recirculation air from at least one recirculation air line in a second premixer. The air premixed in the first and the second premixer is mixed in a main mixer, wherein the main mixer is supplied exclusively with premixed air from the first and/or the second premixer.

The recirculation air flowing through the recirculation air lines is preferably filtered by means of suitable filter devices.

In the event of failure of the first conveying device for conveying recirculation air through a first recirculation air line or failure of a second conveying device for conveying recirculation air through a second recirculation air line, recirculation air flowing through the first or the second recirculation air line may be conveyed by the still intact conveying device into the second or the first recirculation air line through a first connection line, which branches off from the first recirculation air line downstream of a first filter device disposed in the first recirculation air line and opens out into the second recirculation air line downstream of a second filter device disposed in the second recirculation air line.

Furthermore, in the event of failure of the first or the second conveying device, by means of the still intact conveying device recirculation air flowing through the first or the second recirculation air line may be conveyed by the still intact conveying device back into the first or the second recirculation air line through a second connection line, which branches off from the first recirculation air line downstream of a first conveying device disposed in the first recirculation air line and opens out into the second recirculation air line downstream of a second conveying device disposed in the second recirculation air line.

Alternatively, in the event of failure of a first conveying device for conveying recirculation air through a first recirculation air line or failure of a second conveying for conveying recirculation air through a second recirculation air line, recirculation air flowing through the first or the second recirculation air line may be conveyed by the still intact conveying device into a junction line, into which the first recirculation air line and the second recirculation air line open out and which is connected to the first premixer via a first branch line and to the second premixer via a second branch line. The junction line preferably comprises over part of its length two junction line portions that are adapted to carry mutually parallel flows. The first conveying device is preferably disposed in a first junction line portion, while the second conveying device is preferably disposed in a second junction line portion.

The warm recirculation air may be supplied at an angle of ca. 45° to 90° to the cold fresh air flow flowing through the first and/or the second premixer. The cold fresh air may moreover be supplied to the first and/or the second premixer through a fresh-air line connection, which has a smaller flow cross section than a premixing portion of the first and/or the second premixer that is disposed downstream of the fresh-air line connection. The fresh-air line connection may be of a two-part construction.

The flow of the recirculation air through a recirculation-air line connection of the first and/or the second premixer may be a controlled by means of a flow control device disposed in the recirculation-air line connection. The flow control device may comprise at least one flow control wedge, the cross section of which widens in the direction of flow of the recirculation air through the recirculation-air line connection. The flow of the fresh air through the fresh-air line connection of the first and/or the second premixer may moreover be controlled by means of a flow control device disposed in the fresh-air line connection of the first and/or the second premixer. The flow control device may comprise at least one flow control wedge, the cross section of which widens in the direction of flow of the fresh air through the fresh-air line connection.

The premixed air flows from the first and the second premixer may be supplied to the main mixer from substantially opposite directions and collide with one another in a mixing portion of the main mixer. A first and/or a second premixed air connection of the main mixer may have a course that substantially follows an elliptical path. The flow of the premixed air through the first and/or the second premixed air connection of the main mixer may be controlled by means of a flow control device disposed in the first and/or the second premixed air connection of the main mixer. The flow control device may comprise at least one flow control wedge, the cross section of which widens in the direction of flow of the premixed air through the first and/or the second premixed air connection.

An aircraft air conditioning system according to the invention comprises a previously described mixer assembly, which may be operated in accordance with the previously described method.

A preferred embodiment of the invention is described in detail below with reference to the accompanying diagrammatic drawings, which show FIG. 1 a first embodiment of a mixer assembly that is suitable for use in an aircraft air conditioning system, FIG. 2 a second embodiment of a mixer assembly that is suitable for use in an aircraft air conditioning system, FIGS. 3a-c a cross section, a side view and a plan view of a first embodiment of a premixer that is usable in the mixer assemblies according to FIGS. 1 and 2, FIGS. 4a-c a cross section, a side view and a plan view of a second embodiment of a premixer that is usable in the mixer assemblies according to FIGS. 1 and 2, FIGS. 5a-c a cross section, a side view and a plan view of a third embodiment of a premixer that is usable in the mixer assemblies according to FIGS. 1 and 2, FIGS. 6a-c a first three-dimensional side view, a second three-dimensional side view and a plan view of a first embodiment of a main mixer that is usable in the mixer assemblies according to FIGS. 1 and 2, and FIGS. 7a-c a first three-dimensional side view, a second three-dimensional side view and a plan view of a second embodiment of a main mixer that is usable in the mixer assemblies according to FIGS. 1 and 2.

Figure 1:
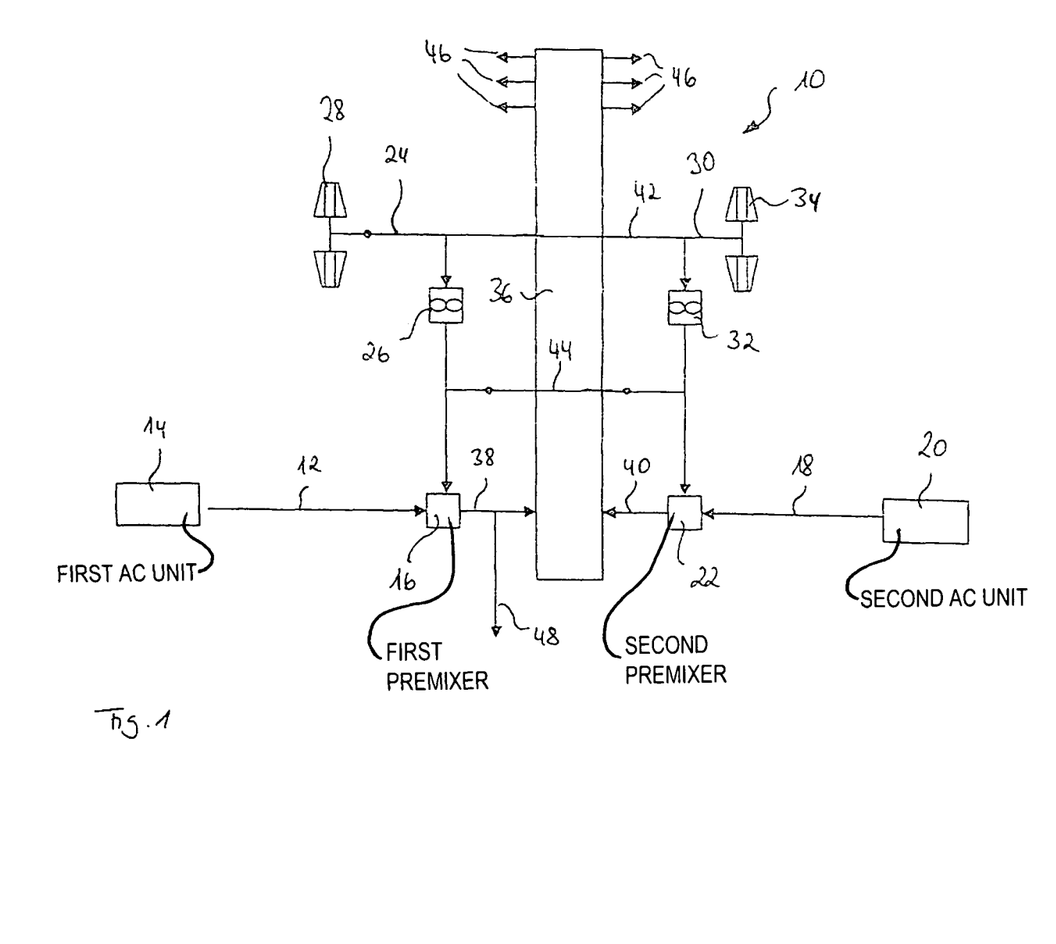

FIG. 1 shows a mixer assembly 10 that is suitable for use in an aircraft air conditioning system and comprises a first fresh air line 12, which connects a first air conditioning unit 14 to a first premixer 16. In a similar manner, a second fresh air line 18 connects a second air conditioning unit 20 to a second premixer 22. During operation of the mixer assembly 10 cold fresh air that is produced by the first and the second air conditioning unit 14, 20 flows through the first and the second fresh air line 12, 18.

The mixer assembly 10 further comprises a first recirculation air line 24, which is used to convey recirculation air from an aircraft cabin into the first premixer 16. For conveying the recirculation air through the first recirculation air line 24, a first conveying device 26 is disposed in the first recirculation air line 24. The first conveying device 26 is configured for example in the form of a blower. For filtering the recirculation air discharged from the aircraft cabin, a first filter device 28 is disposed in an inlet region of the first recirculation air line 24. In a similar manner, a second recirculation air line 30 is used to convey recirculation air from the aircraft cabin into the second premixer 22. For conveying the recirculation air through the second recirculation air line 30 a second conveying device 32 is disposed in the second recirculation air line 30. A second filter device 34 disposed in an inlet region of the second recirculation air line 30 is used to filter the recirculation air that is conveyed from the aircraft cabin into the second recirculation air line 30.

In the first premixer 16 the recirculation air flowing through the first recirculation air line 24 is mixed with the cold fresh air line that is conveyed through the first fresh air line 12 into the first premixer 16. In a similar manner, in the second premixer 22 the recirculation air flowing through the second recirculation air line 30 is mixed with the cold fresh air that is supplied through the second fresh air line 18 to the second premixer 22.

A main mixer 36 of the mixer assembly 10 is connected by a first premixed air line 38 to the first premixer 16 and by a second premixed air line 40 to the second premixer 22. The main mixer 36 is supplied through the first and the second premixed air line 38, 40 exclusively with premixed air from the first and the second premixer 16, 22. The mixer assembly 10 is therefore of a two-stage construction. The temperatures and the flow rates of the premixed air supplied to the main mixer 36 through the first premixed air line 38 and the second premixed air line 40 may be controlled in a desired manner independently of one another. By virtue of supplying the main mixer 36 with exclusively premixed air, the temperature differences arising in the main mixer 3 may however be kept comparatively low. As a result, the mixing effect of the main mixer 36 may be improved and the mixing quality achieved by the main mixer 36 may be held more or less constant even in the event of variations of the temperature and flow rate of the fresh air flows flowing through the first and the second fresh air line 12, 18 and of the recirculation air flows flowing through the first and the second recirculation air line 24, 30. Even failure of an air flow does not lead to a drastic decline in the mixing quality achievable by the main mixer 36. Finally, the main mixer 36 is well protected from icing caused by extreme temperature differences in the main mixer 36.

A first connection line 42 branches off from the first recirculation air line 24 downstream of the first filter device 28 disposed in the first recirculation air line 24 and upstream of the first conveying device 26 disposed in the first recirculation air line 24. Downstream of the second filter device 34 disposed in the second recirculation air line 30 and upstream of the second conveying device 32 disposed in the second recirculation air line 30 the first connection line 42 opens out into the second recirculation air line. A second connection line 44 is further provided, which branches off from the first recirculation air line 24 downstream of the first conveying device 26 disposed in the first recirculation air line 24 and opens out into the second recirculation air line 30 downstream of the second conveying device 32 disposed in the second recirculation air line 30.

By virtue of the development of the mixer assembly 10 with the first and the second connection line 42, 44, in the event of failure of the first conveying device 26 air may be conveyed by means of the still intact second conveying device 32 through the first filter device 28 into the first recirculation air line 24 and through the first connection line 42 into the second recirculation air line 30. Downstream of the second conveying device 32 the recirculation air flowing through the second recirculation air line 30 may be partially conveyed via the second connection line 44 back into the first recirculation air line 24 and supplied to the first premixer 16. In a similar manner, in the event of failure of the second conveying device 32 recirculation air may be conveyed by means of the still intact first conveying device 26 through the second filter device 34 into the second recirculation air line 30 and finally through the first connection line 42 into the first recirculation air line 24. Downstream of the first conveying device 26 the recirculation air flowing through the first recirculation air line 24 may then be partially conveyed via the second connection line 44 back into the second recirculation air line 30 and supplied to the second premixer 22.

Such a configuration of the mixer assembly 10, even in the event of failure of one of the conveying devices 26, 32, makes it possible to supply recirculation air into the mixer assembly 10 through the first and the second filter device 28, 34. Consequently, even in the event of failure of a conveying device 26, 32 there is a uniform flow through both filter devices 28, 34, with the result that high pressure losses, which would occur if recirculation air were supplied to the mixer assembly 10 through only one filter device 28, 34, may be avoided. Furthermore, a uniform loading and hence uniform clogging of the filter devices 28, 34 is guaranteed, this likewise helping to avoid high pressure losses through the filter devices 28, 34.

The mixed air produced in the main mixer 36 is discharged from the main mixer 36 through mixed-air outlet lines 46 connected to the main mixer 36. The mixed-air outlet lines 46 supply the mixed air produced in the main mixer 36 to the cabin of the aircraft. A premixed-air outlet line 48 moreover branches off from the first premixed air line 38 and supplies a cargo area of the aircraft with premixed air from the first premixer 16.

Figure 2:
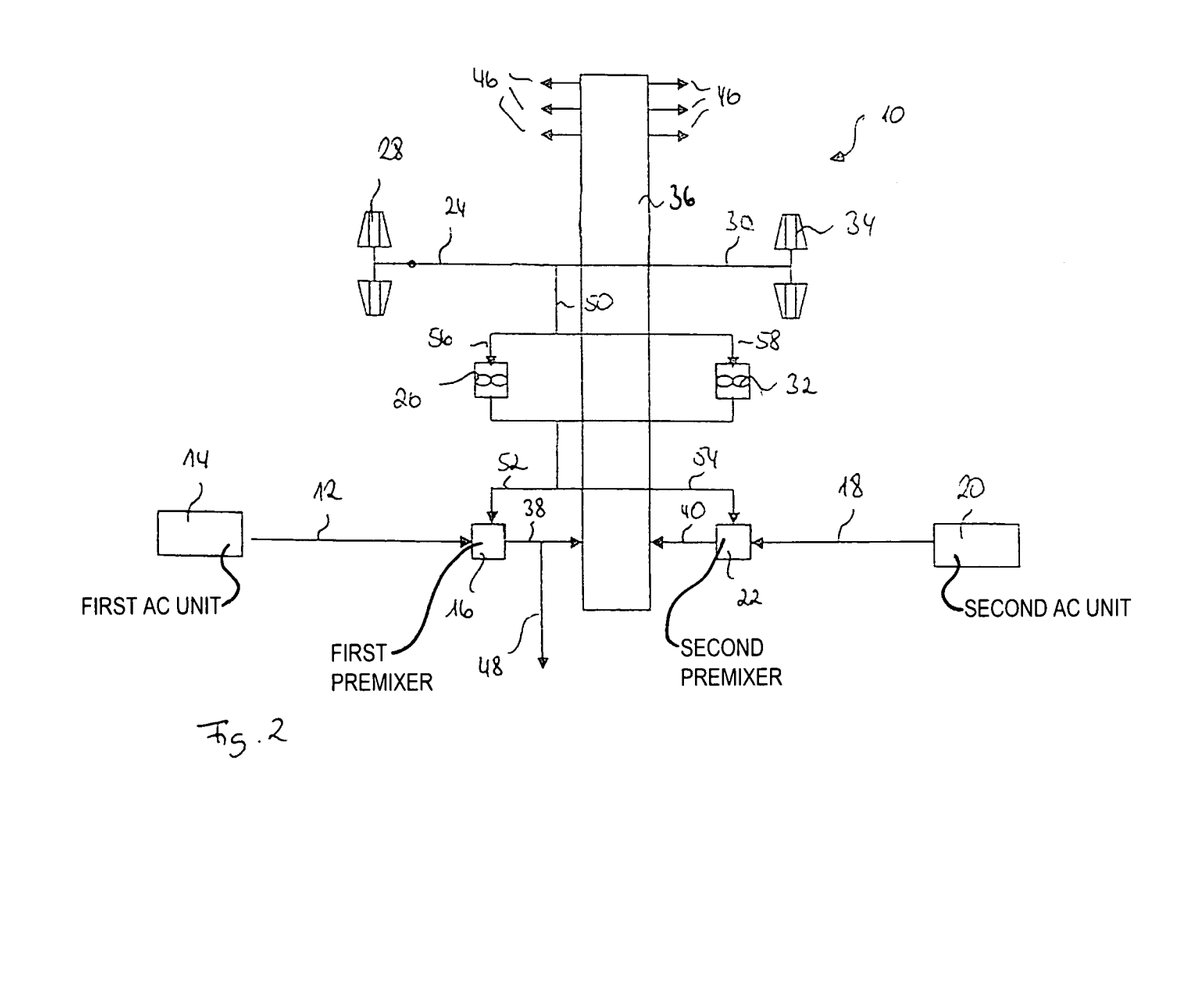

The mixer assembly 10 represented in FIG. 2 differs from the system according to FIG. 1 in that the first recirculation air line 24 and the second recirculation air line 30 open out into a junction line 50 downstream of the first filter device 28 disposed in the first recirculation air line 24 and downstream of the second filter device 34 disposed in the second recirculation air line 30 respectively. The junction line 50 is connected by a first branch line 52 to the first premixer 16 and by a second branch line 54 to the second premixer 22. Over part of its length the junction line 50 comprises two junction line portions 56, 58 that may carry mutually parallel flows. The first conveying device 26 is disposed in the first junction line portion 56, while the second conveying device 32 is disposed in the second junction line portion 58.

In the event of failure of the first conveying device 26, recirculation air may be conveyed by the still intact second conveying device 32 through the first filter device 28 into the first recirculation air line 24 and from there into the junction line 50. Via the first branch line 52 the first premixer 16 may then be supplied with some of the recirculation air flowing through the junction line 50. In a similar manner, in the event of failure of the second conveying device 32 recirculation air may be conveyed by means of the still intact first conveying device 26 through the second filter device 34 and the second recirculation air line 30 into the junction line 50. The supplying of the second premixer 22 with some of the recirculation air flowing through the junction line 50 then occurs via the second branch line 54.

The line configuration of the mixer assembly 10 represented in FIG. 2, like the line configuration of the system illustrated in FIG. 1, even in the event of failure of a conveying device 26, 32 makes it possible for recirculation air to be conveyed through both filter devices 28, 34. Thus, a high pressure loss, which would be caused if recirculation air were conveyed through only one filter device 28, 34, is similarly prevented. A uniform flow through both filter devices 28, 34 and hence a uniform clogging of both filter devices 28, 34 is moreover enabled.

Figure 3:
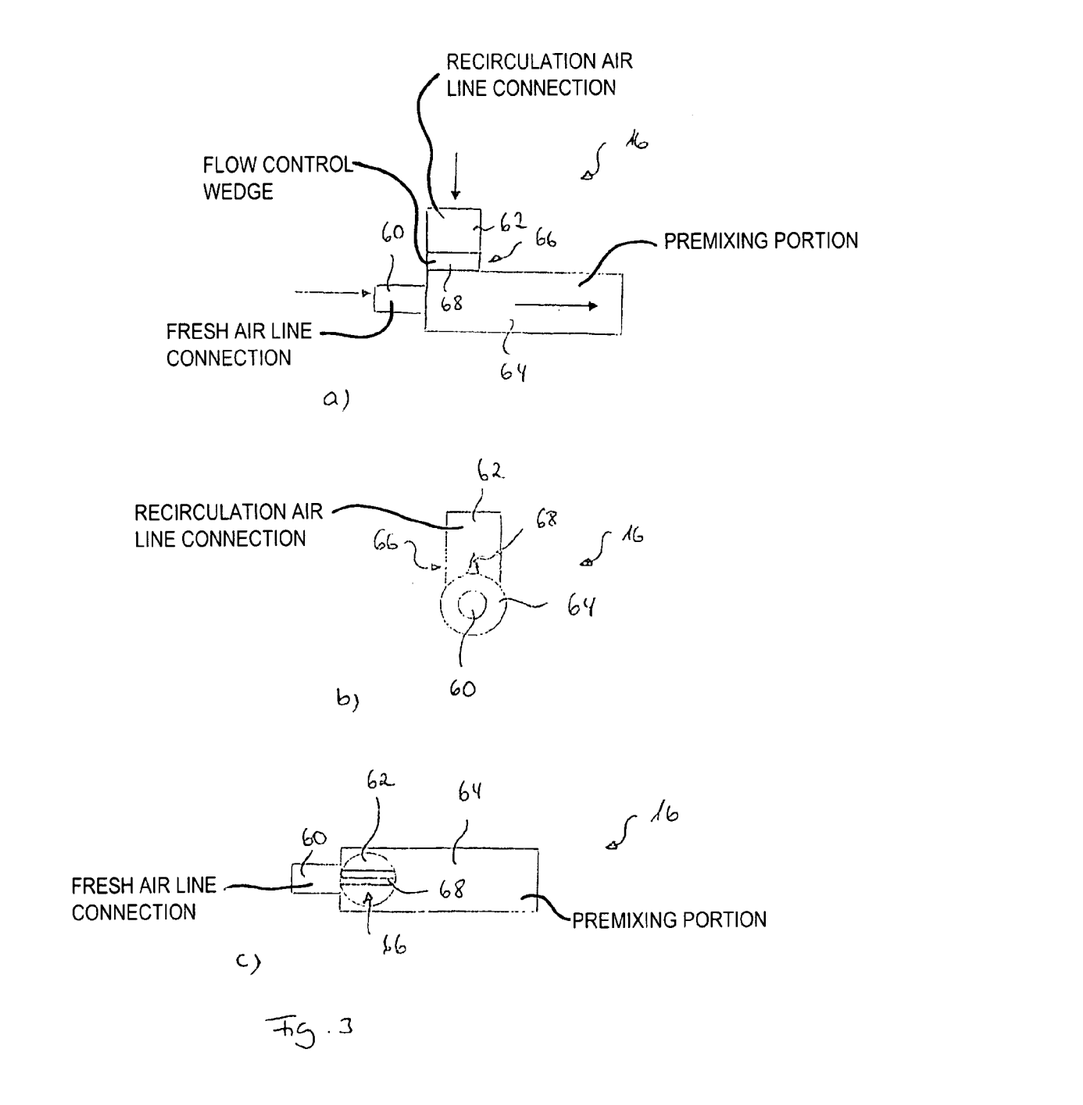

FIGS. 3a to c show a first embodiment of a first premixer 16 that is usable in the mixer assembly 10 according to FIGS. 1 and 2. The first premixer 16 is configured in the form of a tubular mixer and comprises a fresh-air line connection 60 as well as a recirculation-air line connection 62. The fresh-air line connection 60 and the recirculation-air line connection 62 are disposed at an angle of ca. 90° relative to one another, with the result that the recirculation air is supplied at an angle of ca. 90° to the fresh air flow flowing through the first premixer 16. The fresh-air line connection 60 has a smaller flow cross section than a premixing portion 64 of the first premixer 16 disposed downstream of the fresh-air line connection 60 and therefore acts as a nozzle that supplies the fresh air at a high velocity into the premixing portion 64. As a result of the injector effect of the fresh air flow supplied at a high velocity into the premixing portion 64, the pressure loss in the premixing portion 64 is minimized.

In the recirculated-air line connection 62 of the premixer 16 a flow control device 66 comprising a flow control wedge 68 is disposed. The cross section of the flow control wedge 68 widens in the direction of flow of the recirculation air through the recirculation-air line connection 62 and divides the recirculation air flow flowing through the recirculation-air line connection 62 into two partial flows. This leads to the formation of a warm bypass flow that positions itself around the cold fresh air flow and hence prevents icing of the first premixer 16. By means of the flow control wedge 68 a layering of the cold and warm air flows supplied to the first premixer 16 through the fresh-air line connection 60 and the recirculation-air line connection 62 is moreover achieved.

Figure 4:
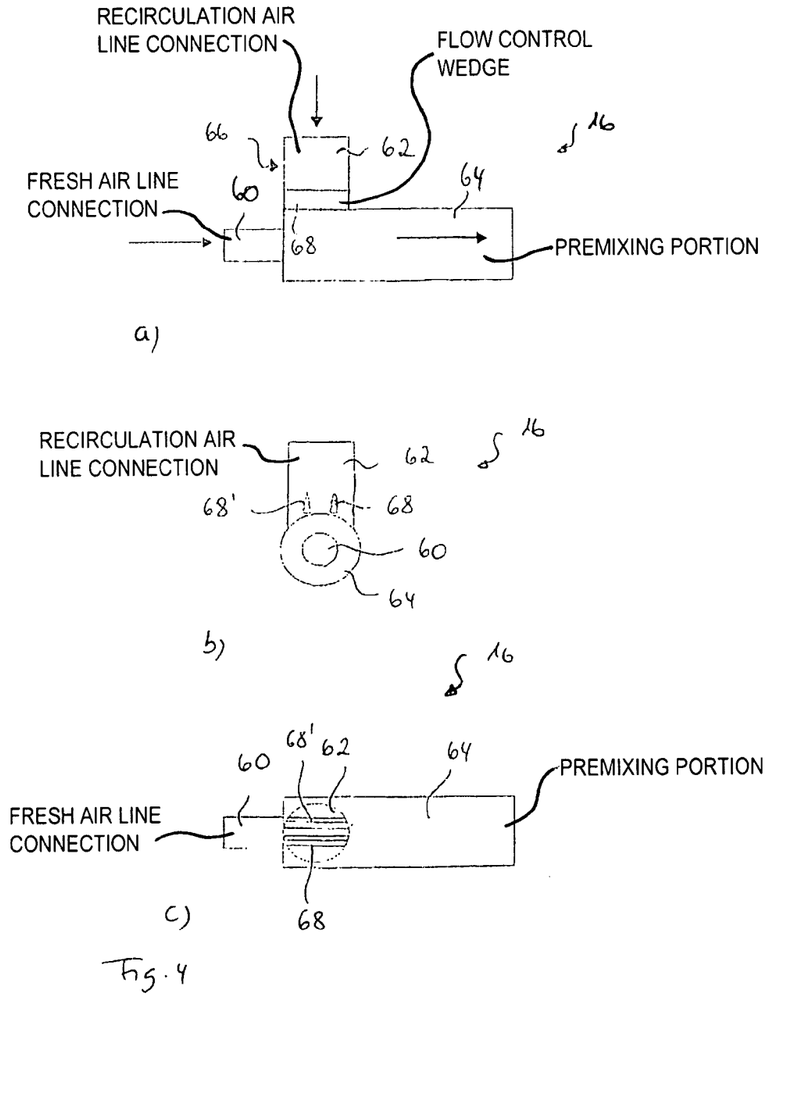

A first premixer 16 shown in FIGS. 4a to c differs from the first premixer 16 according to FIGS. 3a to c merely in that the flow control device 66 disposed in the recirculation-air line connection 66 comprises not just one flow control wedge 68 but two flow control wedges 68, 68'. A flow control device 66 comprising two flow control wedges 68, 68' enables a further division of the recirculation air flow flowing through the recirculation-air line connection 62 and hence a greater layering of cold and warm air flows in the first premixer 16.

Figure 5:
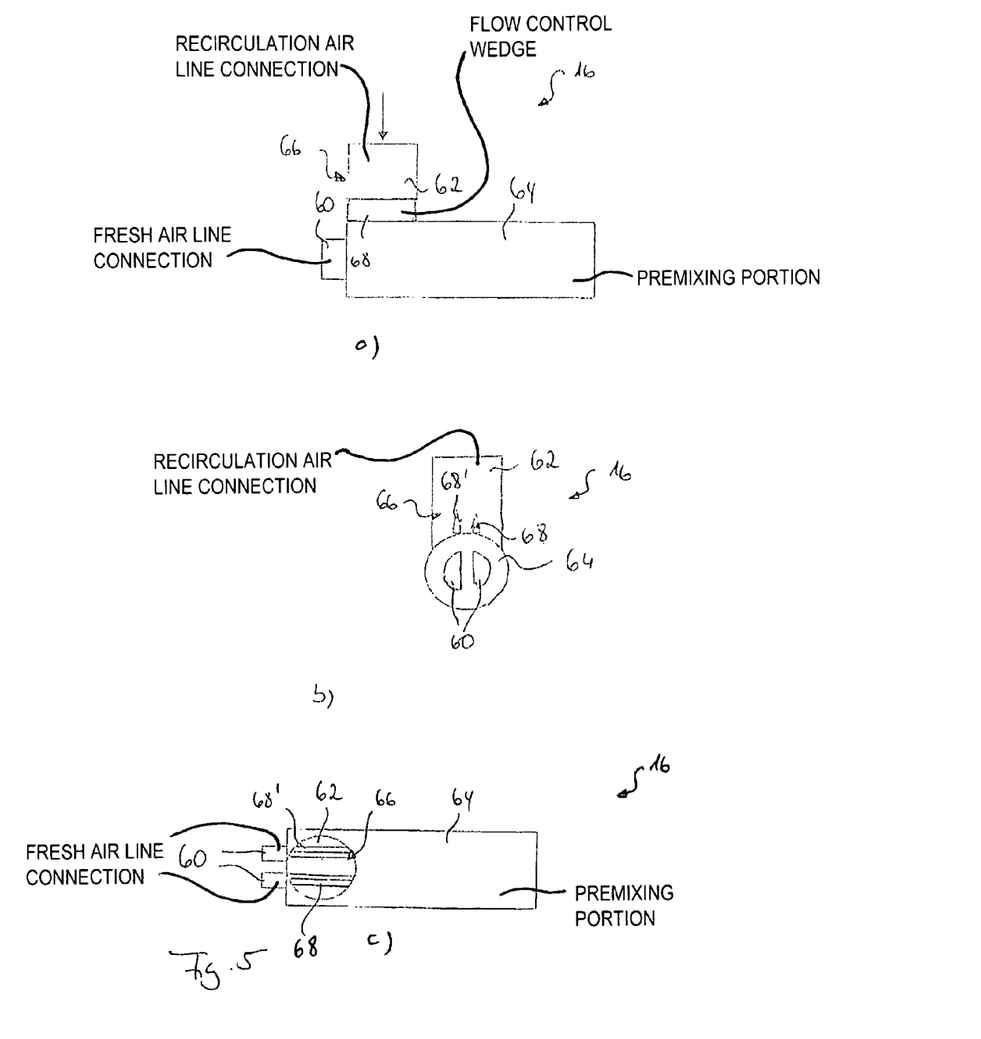

Finally, a first premixer 16 represented in FIGS. 5a to c differs from the first premixer 16 according to FIGS. 4a to c in that the fresh-air line connection 60 is of a two-part construction, wherein each of the two partial connections has a flow cross section that is reduced again compared to the fresh-air line connection 60 of the first premixer 16 represented in FIGS. 4a to c. As a result, the nozzle effect of the fresh-air line connection 60 is intensified.

Although FIGS. 3a to c, 4a to c and 5a to c show in each case a first premixer 16, the second premixer 22 that is used in the mixer assemblies 10 according to FIGS. 1 and 2 may of course also be designed in the manner represented in FIG. 3a to c, 4a to c or 5a to c. The first and the second premixer 16, 22 may, depending on requirements, be of an identical or different design.

Figure 6:
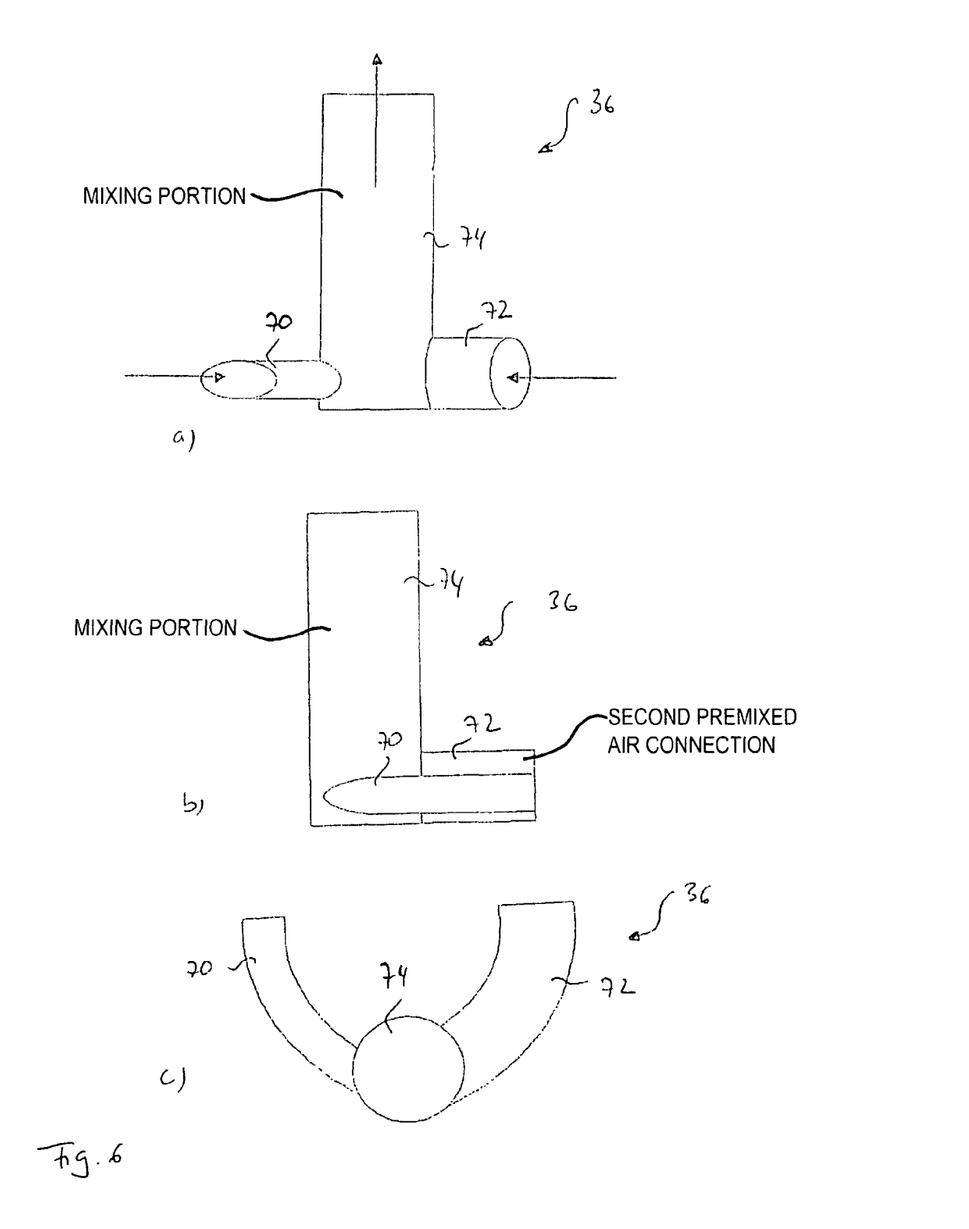

In FIGS. 6a to c a first embodiment of a main mixer 36 that is suitable for use in the mixer assemblies 10 according to FIGS. 1 and 2 is shown. The main mixer 36 comprises a first premixed air connection 70 and a second premixed air connection 72. The premixed air connections 70, 72 are disposed substantially opposite one another in such a way that the premixed air flows from the first and the second premixer 16, 22 are supplied to the main mixer 36 from substantially opposite directions and collide with one another in a mixing portion 74 of the main mixer 36. The first and the second premixed air connection 70, 72 each have a course that substantially follows an elliptical path. In the embodiment shown in FIGS. 6a to c, the second premixed air connection 72 has a larger flow cross section than the first premixed air connection 70.

Figure 7:
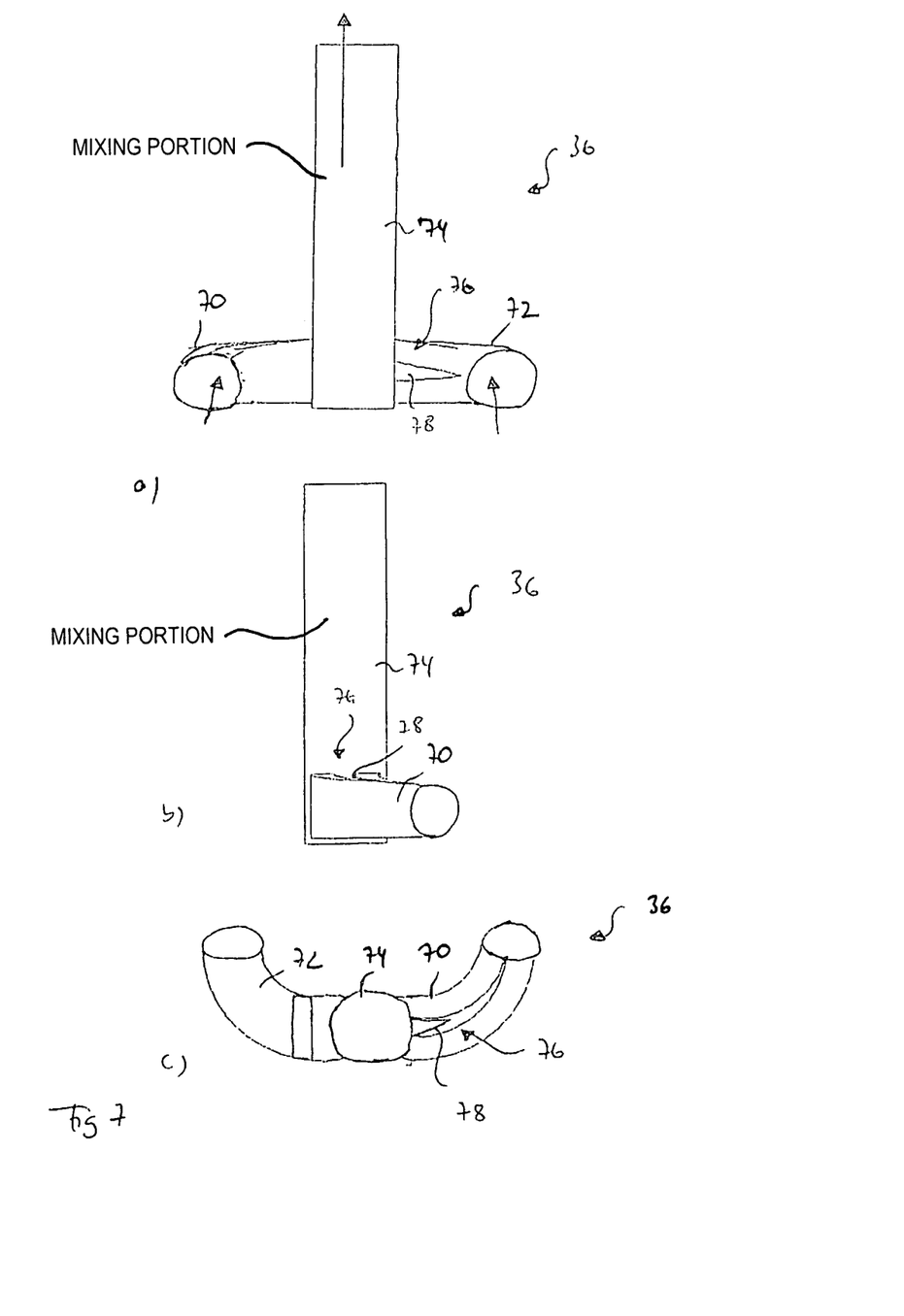

Finally, a further embodiment of a main mixer 36 that is suitable for use in the mixer assemblies 10 according to FIGS. 1 and 2 is represented in FIGS. 7a to c. The main mixer 36 shown in FIGS. 7a to c differs from the main mixer 36 according to FIGS. 6a to c substantially in that a flow control device 76 is disposed in the first and the second premixed air connection 70, 72. The flow control device 76 comprises in each case a flow control wedge 78, the cross section of which widens in the direction of flow of the premixed air through the first and the second premixed air connection 70, 72.

The invention claimed is:

1. A mixer assembly for an aircraft air conditioning system, comprising:
    first and second fresh air lines, which are configured to be flowed-through with cold fresh air during operation of the mixer assembly,
    first and second recirculation air lines, which are configured to be flowed through with recirculation air discharged from an aircraft cabin during operation of the mixer assembly,
    a first premixer, which is connected to the first fresh air line and the first recirculation air line and is adapted configured to mix the fresh air conveyed through the first fresh air line into the first premixer with the recirculation air conveyed through the first recirculation air line into the first premixer,
    a second premixer, which is connected to the second fresh air line and the second recirculation air line and is configured to mix the fresh air conveyed through the fresh air line into the second premixer with the recirculation air conveyed through the second recirculation air line into the second premixer,
    a main mixer, which is connected by a first premixed air line to the first premixer and by a second premixed air line to the second premixer, wherein the main mixer is configured to be supplied through the first premixed air line and the second premixed air line exclusively with premixed air from the first and/or the second premixer,
    a first filter device disposed in the first recirculation air line, and
    a second filter device disposed in the second recirculation air line,
    a first connection line, which branches off from the first recirculation air line downstream of the first filter device disposed in the first recirculation air line and opens out into the second recirculation air line downstream of the second filter device disposed in the second recirculation air line.

2. The mixer assembly according to claim 1, wherein the mixer assembly comprises a second connection line, which branches off from the first recirculation air line downstream of a first conveying device disposed in the first recirculation air line and opens out into the second recirculation air line downstream of a second conveying device disposed in the second recirculation air line.

3. The mixer assembly according to claim 1, wherein the first recirculation air line and the second recirculation air line open out into a junction line, which is connected to the first premixer via a first branch line and to the second premixer via a second branch line, wherein the junction line preferably over part of its length comprises two junction line portions that are adapted configured to carry mutually parallel flows, a first conveying device is disposed in a first junction line portion and a second conveying device is disposed in a second junction line portion.

4. The mixer assembly according to one of claim 1, wherein at least one of the first and the second premixer is configured in the form of a tubular mixer and/or that a fresh-air line connection and a recirculation-air line connection of the first and/or the second premixer are disposed in such a way that the warm recirculation air is supplied at an angle of approximately 45° to 90° to the cold fresh air flow flowing through the first and/or the second premixer.

5. The mixer assembly according to claim 4, wherein the fresh-air line connection of the first and/or the second premixer has a smaller flow cross section than a premixing portion of the first and/or the second premixer disposed downstream of the fresh-air line connection and is in particular of a two-part construction, that in the recirculation-air line connection of the first and/or the second premixer a flow control device is disposed, which in particular comprises at least one flow control wedge, the cross section of which widens in the direction of flow of the recirculation air through the recirculation-air line connection, and/or that in the fresh-air line connection of the first and/or the second premixer a flow control device is disposed, which in particular comprises at least one flow control wedge, the cross section of which widens in the direction of flow of the fresh air through the fresh-air line connection.

6. The mixer assembly according to one of claim 1, wherein the main mixer comprises a first premixed air connection and a second premixed air connection, which are disposed in such a way that the premixed air flows from the first and the second premixer are supplied to the main mixer from substantially opposite directions and collide with one another in a mixing portion of the main mixer.

7. The mixer assembly according to claim 6, wherein the first and/or the second premixed air connection of the main mixer have/has a course that substantially follows an elliptical path, and/or that in the first and/or the second premixed air connection of the main mixer a flow control device is disposed, which in particular comprises at least one flow control wedge, the cross section of which widens in the direction of flow of the premixed air through the first and/or the second premixed air connection.

8. A method of operating a mixer assembly for an aircraft air conditioning system, comprising the steps:
conveying cold fresh air through a first and second fresh air lines,
conveying recirculation air discharged from an aircraft cabin through first and second recirculation air lines,
premixing the fresh air from the first fresh air line with the recirculation air from the first recirculation air line in a first premixer,
premixing the fresh air from the second fresh air line with the recirculation air from the second recirculation air line in a second premixer, and
mixing the air premixed in the first and the second premixer in a main mixer, wherein the main mixer is supplied exclusively with premixed air from the first and/or the second premixer,
filtering the recirculation air flowing through the first recirculation air line via a suitable first filter device,
filtering the recirculation air flowing through the second recirculation air line via a suitable second filter device,
wherein in an event of failure of a first conveying device for conveying recirculation air through the first recirculation air line or failure of a second conveying device for conveying recirculation air through the second recirculation air line, recirculation air flowing through the first or the second recirculation air line is conveyed by the still intact conveying device into the second or the first recirculation air line through a first connection line, which branches off from the first recirculation air line downstream of the first filter device disposed in the first recirculation air line and opens out into the second recirculation air line downstream of the second filter device disposed in the second recirculation air line.

9. The method according to claim 8, wherein, in an event of failure of the first or the second conveying device, recirculation air flowing through the first or the second recirculation air line is conveyed by the still intact conveying device back into the first or the second recirculation air line through a second connection line, which branches off from the first recirculation air line downstream of a first conveying device disposed in the first recirculation air line and opens out into the second recirculation air line downstream of a second conveying device disposed in the second recirculation air line.

10. The method according to claim 9, wherein, in an event of failure of a first conveying device for conveying recirculation air through a first recirculation air line or failure of a second conveying device for conveying recirculation air through a second recirculation air line, recirculation air flowing through the first or the second recirculation air line is conveyed by the still intact conveying device into a junction line, into which the first recirculation air line and the second recirculation air line open and which is connected to the first premixer via a first branch line and to the second premixer via a second branch line, wherein the junction line over part of its length comprises two junction line portions that are configured to carry mutually parallel flows, the first conveying device is disposed in a first junction line portion and the second conveying device is disposed in a second junction line portion.

11. The method according to one of claim 8, wherein the warm recirculation air is supplied at an angle of approximately 90° to the cold fresh air flow flowing through the first and/or the second premixer, that the cold fresh air is supplied to the first and/or the second premixer through a fresh-air line connection, which has a smaller flow cross section than a premixing portion of the first and/or the second premixer disposed downstream of the fresh-air line connection and which in particular is of a two-part construction, that the flow of the recirculation air through a recirculation-air line connection of the first and/or the second premixer is controlled by means of a flow control device, which is disposed in the recirculation-air line connection and in particular comprises at least one flow control wedge, the cross section of which widens in the direction of flow of the recirculation air through the recirculation-air line connection, and/or that the flow of the fresh air through the fresh-air line connection of the first and/or the second premixer is controlled by means of a flow control device, which is disposed in the fresh-air line connection and in particular comprises at least one flow control wedge, the cross section of which widens in the direction of flow of the fresh air through the fresh-air line connection.

12. The method according to one of claim 8, wherein the premixed air flows from the first and the second premixer are supplied to the main mixer from substantially opposite directions and collide with one another in a mixing portion of the main mixer, wherein a first and/or a second premixed air connection of the main mixer in particular have/has a course that substantially follows an elliptical path, and/or that the flow of the premixed air through the first and/or the second premixed air connection of the main mixer is controlled by means of a flow control device, which is disposed in the first and/or the second premixed air connection of the main mixer and in particular comprises at least one flow control wedge, the cross section of which widens in the direction of flow of the premixed air through the first and/or the second premixed air connection.

13. An aircraft air conditioning system, comprising a mixer assembly according to claim 1.

* * * * *